(12) United States Patent
Yamada

(10) Patent No.: US 8,427,823 B2
(45) Date of Patent: Apr. 23, 2013

(54) MOUNTING DEVICE FOR STORAGE DEVICE

(75) Inventor: Satoru Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 91 days.

(21) Appl. No.: 13/137,197

(22) Filed: Jul. 27, 2011

(65) Prior Publication Data

US 2011/0284422 A1 Nov. 24, 2011

Related U.S. Application Data

(63) Continuation of application No. PCT/JP2009/051727, filed on Feb. 2, 2009.

(51) Int. Cl.
*H05K 7/20* (2006.01)

(52) U.S. Cl.
USPC ............ 361/679.39; 361/679.33; 361/679.38; 361/724; 361/725; 312/223.1; 312/223.2; 312/334.4

(58) Field of Classification Search ............. 361/679.39, 361/727
See application file for complete search history.

(56) References Cited

U.S. PATENT DOCUMENTS

| 6,359,778 B1 * | 3/2002 | Wu ........................... 361/679.33 |
| 7,719,834 B2 * | 5/2010 | Miyamoto et al. ............. 361/695 |
| 8,054,620 B2 * | 11/2011 | Roesner et al. .......... 361/679.33 |
| 2002/0181197 A1 * | 12/2002 | Huang ........................ 361/685 |

FOREIGN PATENT DOCUMENTS

| JP | 2003-36669 | 2/2003 |
| JP | 3098105 | 9/2003 |
| JP | 2006-235964 | 9/2006 |
| JP | 2007-4885 | 1/2007 |

OTHER PUBLICATIONS

International Search Report for PCT/JP2009/051727, Mailed May 19, 2009.

* cited by examiner

*Primary Examiner* — Anthony Q Edwards
(74) *Attorney, Agent, or Firm* — Staas & Halsey LLP

(57) ABSTRACT

In a mounting device for disk drive, two HDDs are retained in an outer case that forms the mounting device, and an inner case with guiding grooves each including an oblique groove and a parallel groove formed thereon is provided. When the inner case is extracted, the HDD on the front side is caused to ascend in the vertical direction to a position where the HDD on the front side does not obstruct the extraction of the HDD on the back side.

5 Claims, 11 Drawing Sheets

DISK ARRAY DEVICE

DISK ARRAY DEVICE

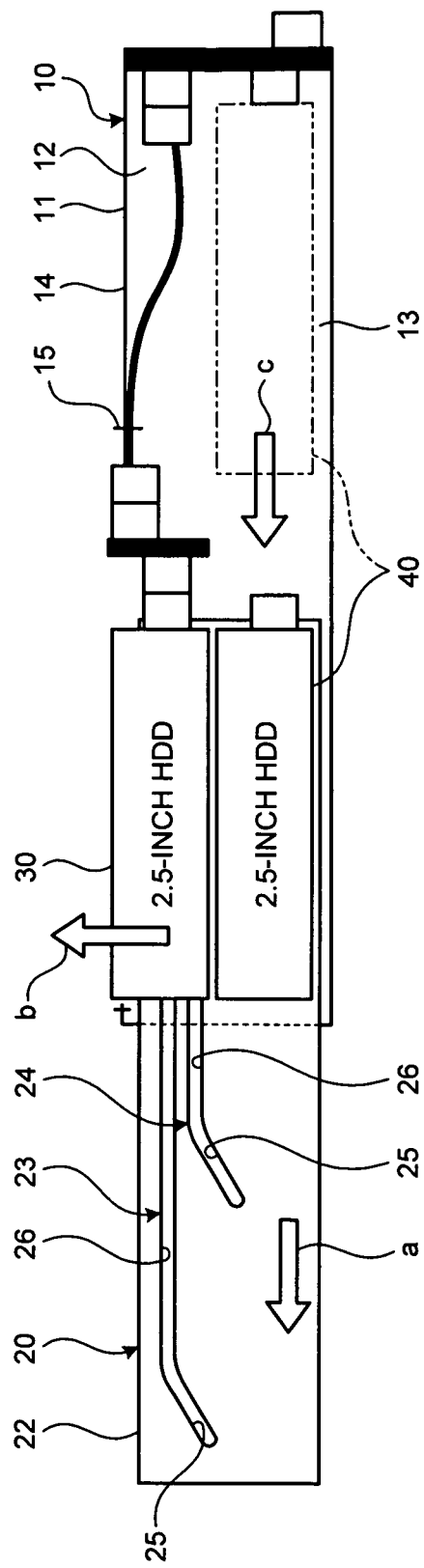

MOUNTING DEVICE FOR STORAGE DEVICE

CROSS-REFERENCE TO RELATED APPLICATION

This application is a continuation of International Application No. PCT/JP2009/051727, filed on Feb. 2, 2009, the entire contents of which are incorporated herein by reference.

FIELD

The embodiments discussed herein are directed to a mounting device for storage device.

BACKGROUND

Conventionally, magnetic disk devices have been widely used as external storage devices that can transfer large-capacity data at high speed. Particularly, in recent years, disk array devices that include a plurality of mounting devices for disk drive have been used as external storage devices that realize high reliability and low prices (Japanese Laid-open Patent Publication No. 2006-235964, and Japanese Laid-open Patent Publication No. 2003-036669).

A mounting device for disk drive is a device that houses therein a plurality of small-sized magnetic disk drives (hereinafter, referred to as "HDDs"), and that stores data in a distributed manner in each of the HDDs. For such a mounting device, two types of HDDs of a 3.5-inch type (first standard) HDD for low-cost and large-capacity applications, and a 2.5-inch type (second standard) HDD for downsized and high-speed applications are used.

However, such a conventional mounting device described above has a problem in that the two types (3.5-inch type and 2.5-inch type) of HDDs may not be selected optionally to be used according to purposes of a user because the width or the like of the device is specified by the standards (the first standard and the second standard).

More specifically, for such a conventional mounting device, enclosures (housings) are provided in accordance with the sizes (width sizes) of the HDDs. Therefore, it is difficult to mount the two types of HDDs of the 3.5-inch type and the 2.5-inch type in a mixed manner on the mounting device.

The 2.5-inch type HDD can be mounted on a slot portion of a 3.5-inch type mounting device. In this case, however, there is a problem in that the advantage of the small size of the 2.5-inch type HDD is impaired.

Furthermore, if two 2.5-inch type HDDs are mounted in the depth direction of the slot portion formed for the 3.5-inch type HDD in the mounting device, there is a problem in that removal of the HDD mounted on the back side requires prior extraction of the HDD mounted on the front side.

The problems of such a conventional mounting device will be described below with reference to FIG. 14 and FIG. 15. FIG. 14 is a view for explaining an operation performed for a conventional mounting device. FIG. 15 is a view for explaining a modification of the mounting device.

Specifically, as illustrated in FIG. 14, in the case where 2.5-inch type HDDs 30 and 40 are housed in slot portions on the front side and the back side inside of a mounting device 10', when the HDD 40 on the back side is to be extracted, the HDD 30 on the front side becomes an obstacle. Therefore, there is a problem in that the HDD 40 on the back side is not extracted until the HDD 30 is extracted toward the front.

If the height of the mounting device 10' is made large to prevent the HDD 30 on the front side from becoming an obstacle when the HDD 40 on the back side is extracted, the HDD 40 on the back side can be extracted. In this case, however, there is a problem in that the height and the size of the mounting device 10' are made large because a space through which the HDD 40 on the back side passes needs to be secured (height H<height H').

SUMMARY

According to an aspect of an embodiment of the invention, a mounting device for storage device includes a first case formed in a size large enough to house therein a storage device of a size conforming to a first standard; a second case that is housed in the first case in a manner extractable therefrom along a longitudinal direction of the first case, and that retains storage devices of a size conforming to a second standard on its front side and its back side in the longitudinal direction viewed from a side to which the second case is to be extracted from the first case; and a guiding groove formed on the second case so as to cause the storage device retained on the front side to move in a vertical direction viewed from the longitudinal direction such that the storage device retained on the front side does not obstruct movement of the storage device retained on the back side that moves along the longitudinal direction on extracting the second case from the first case.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 9B is a view for explaining the inside of the mounting device when the inner case is moved;

DESCRIPTION OF EMBODIMENTS

Preferred embodiments of the present invention will be explained with reference to accompanying drawings.

It is to be noted that the mounting device of the present invention is not limited to the embodiments.

[a] First Embodiment

Figure 1:
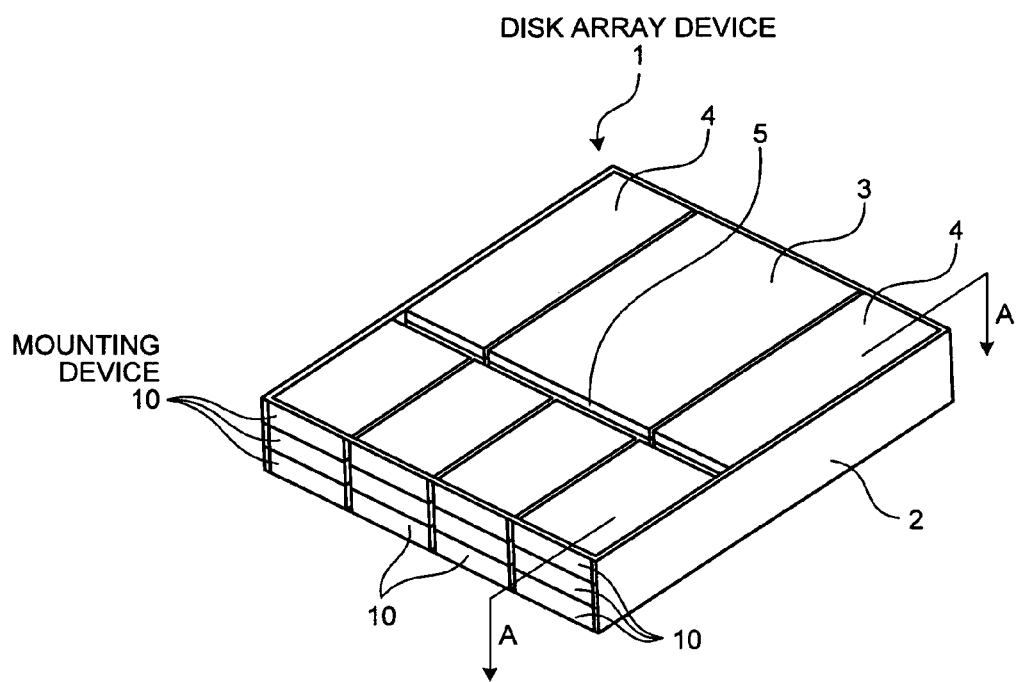
FIG. 1 is a perspective view illustrating a front appearance of a disk array device according to a first embodiment.
Figure 2:
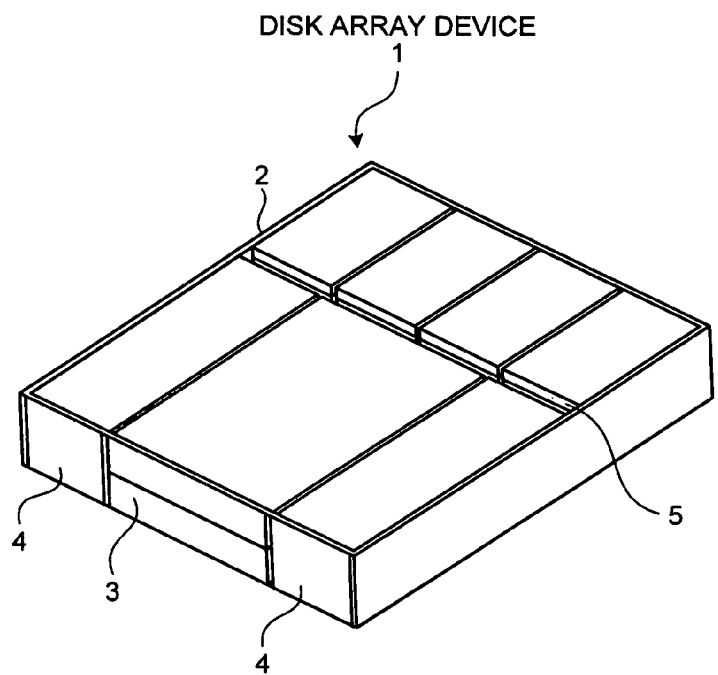
FIG. 2 is a perspective view illustrating a back appearance of the disk array device illustrated in FIG. 1.
Figure 3:
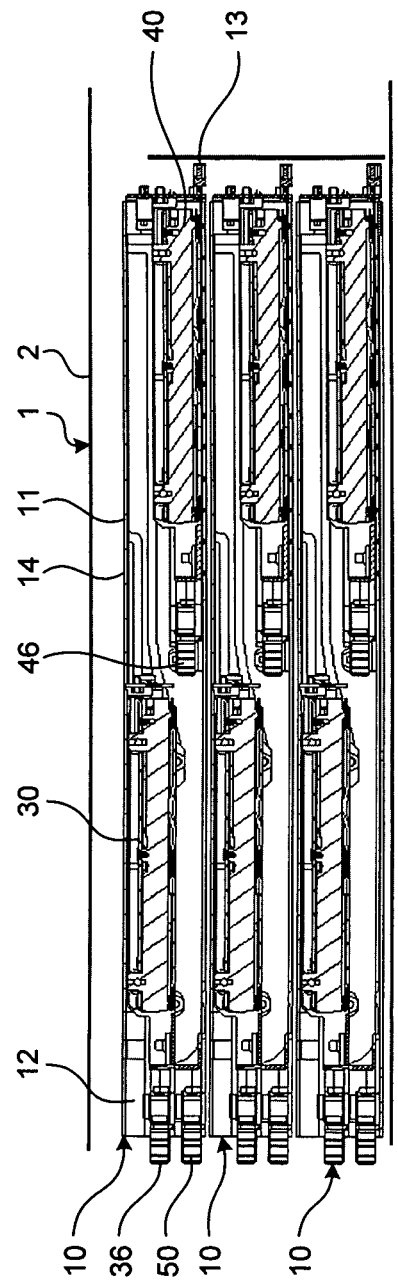
FIG. 3 is a sectional view along line A-A of the disk array device illustrated in FIG. 1.
Figure 4:
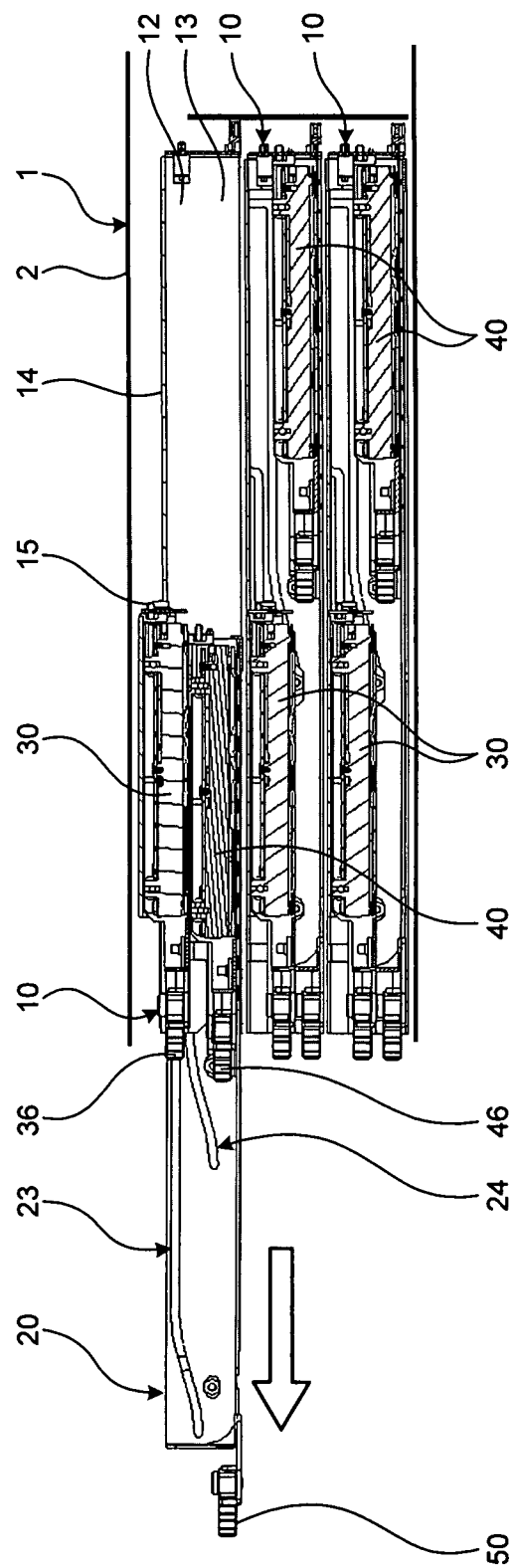
FIG. 4 is a view for illustrating an operation of a mounting device mounted in the disk array device illustrated in FIG. 3.

FIG. 1 is a perspective view illustrating a front appearance of a disk array device according to the first embodiment. FIG. 2 is a perspective view illustrating a back appearance of the disk array device illustrated in FIG. 1. FIG. 3 is a sectional view along line A-A illustrating the inside of the disk array device illustrated in FIG. 1. FIG. 4 is a view for illustrating an operation of a mounting device mounted in the disk array device illustrated in FIG. 3.

Structure of the Disk Array Device

As illustrated in FIG. 1 to FIG. 4, a disk array device 1 is formed in a quadrangular shape as a whole, and includes a plurality (twelve in total, four columns by three rows in FIG. 1) of mounting devices 10 inside of an enclosure 2, and a control board 3 that controls the plurality of mounting devices 10. The have a system in which the mounting devices 10 are electrically connected to power supply units 4 that supply power to the mounting devices 10 mounted in the disk array device 1 via a back panel 5.

The disk array device 1 is a device that accesses the mounting devices 10 mounted therein in parallel to input and output data. Each of the mounting devices 10 houses therein a plurality (two) of HDDs 30 and 40 (FIG. 3). Connectors for electrical connection to the control board 3 and the power supply units 4 are fixed at predetermined positions (lower end) of the back panel 5 arranged on the lower side of the mounting device 10.

As illustrated in FIG. 4, when an inner case 20 arranged in the mounting device 10 is extracted in the front-side direction (direction of the arrow), the mounting device 10 causes the HDD 30 mounted on the front side of a slot portion 12 to ascend along guiding grooves 23 and 24 of the inner case 20.

By causing the HDD 30 to ascend along the guiding grooves 23 and 24 of the inner case 20, the HDD 40 mounted on the back side of a slot portion 13 can be extracted without being obstructed by the HDD 30.

Schematically, in the mounting device 10 of the first embodiment, the inner case 20 that retains 2.5-inch HDDs on the front side and the back side inside of the mounting device 10 for the 3.5-inch HDD is arranged. When the inner case 20 is extracted, the HDD 30 on the front side can be moved upward along the guiding grooves 23 and 24, thereby making it possible to extract the HDD 40 on the back side alone.

Mounting Device

Figure 5:
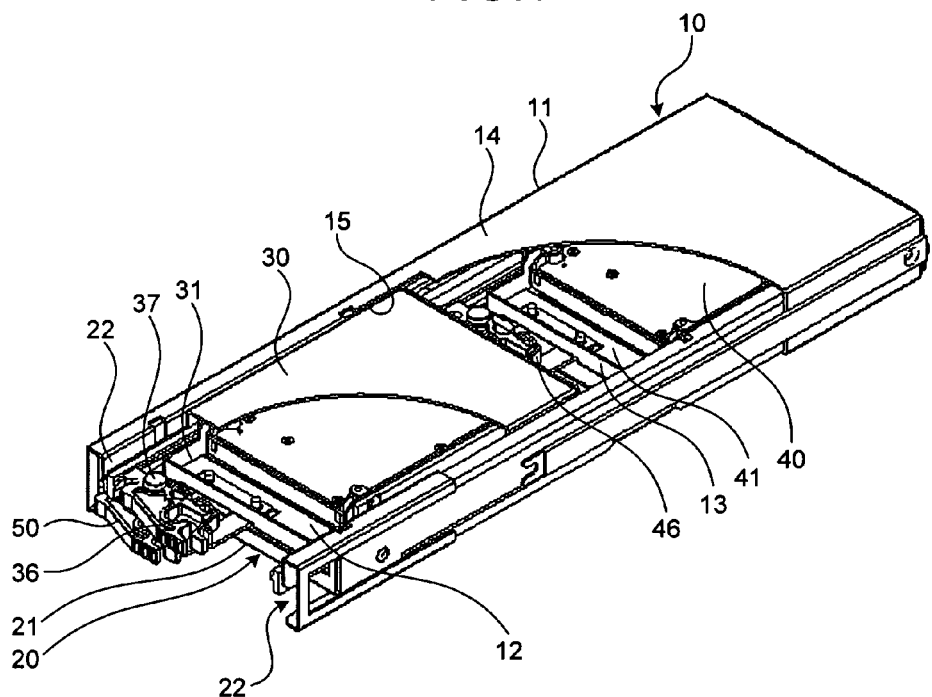
FIG. 5 is a perspective view illustrating a front appearance of the mounting device.
Figure 6:
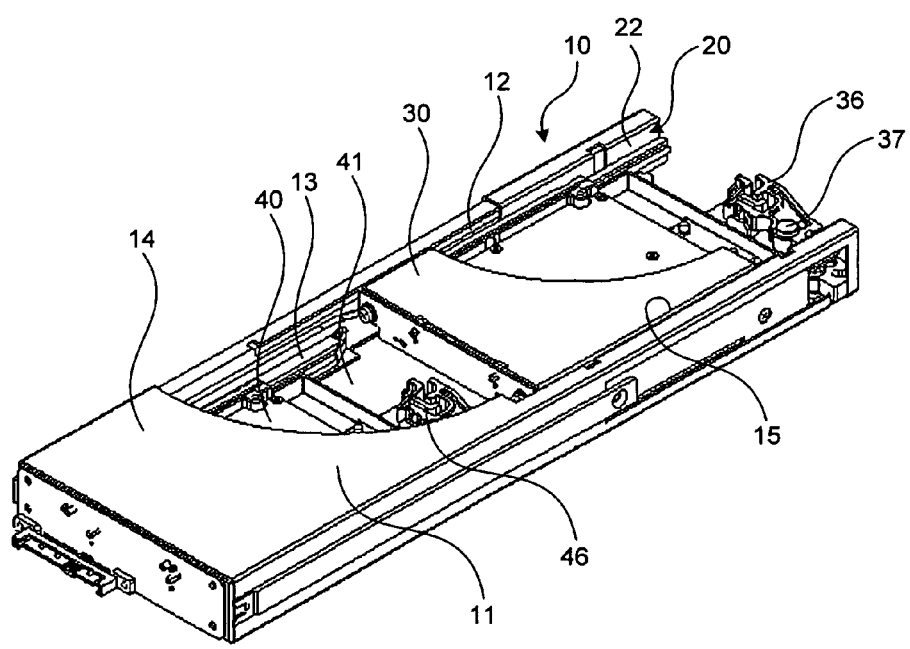
FIG. 6 is a perspective view illustrating a back appearance of the mounting device.
Figure 7:
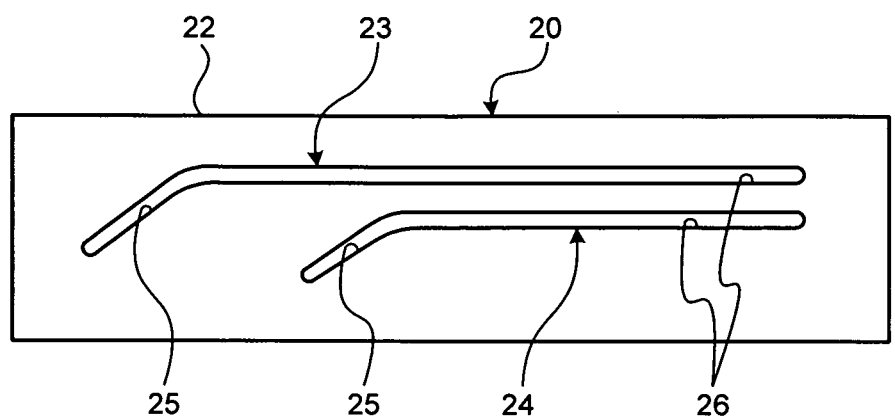
FIG. 7 is a view illustrating a side surface of an inner case.
Figure 8:
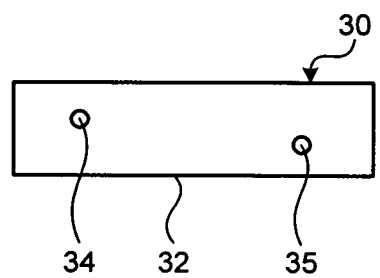
FIG. 8 is a view illustrating a side surface of an HDD.

The mounting device for disk drive mounted on the disk array device will be described in detail. FIG. 5 is a perspective view illustrating a front appearance of the mounting device. FIG. 6 is a perspective view illustrating a back appearance of the mounting device. FIG. 7 is a view illustrating a side surface of the inner case. FIG. 8 is a view illustrating a side surface of the HDD.

As illustrated in FIG. 5 to FIG. 8, the mounting device 10 includes an outer case 11 in an elongated quadrangular shape, and the inner case 20 arranged inside of the outer case 11. As will be described later, the inner case 20 is formed in a rail shape, and arranged to be removable from the inside of the outer case 11 that forms the mounting device 10. The outer case 11 of the mounting device 10 is fixed onto the enclosure 2 (FIG. 1) of the disk array device 1 using attachment screws or the like.

The outer case 11 has a size large enough to house therein the 3.5-inch type HDD. In the outer case 11, the slot portion 12 positioned on the upper side and the slot portion 13 positioned on the lower side are formed. A portion defining an opening 15 having a predetermined width (a size slightly larger than 2.5 inches) is formed on an upper surface plate 14 of the outer case 11. As will be described later, the portion defining an opening 15 is formed as a notched portion through which the HDD 30 protrudes upward when ascending.

In the outer case 11 that forms the mounting device 10, the two HDDs 30 and 40 of the 2.5-inch type HDDs are arranged in a manner retained on the front side and the back side, respectively. In other words, the HDDs 30 and 40 are mounted on the slot portions 12 and 13, respectively, in the outer case 11.

The HDD 30 is fixed onto a base plate 31. A pair of shaft portions 34 and 35 is fixed onto predetermined positions (upper and lower positions in FIG. 8) on a side surface portion 32 of the HDD 30. As will be described later, the pair of shaft portions 34 and 35 of the HDD 30 is fit into the guiding grooves 23 and 24, respectively, formed on side surface plates 22 of the inner case 20.

An ejector 36 used for extracting the HDD 30 by hand and making the HDD 30 fixed at a predetermined position (inside of the outer case 11) is arranged on a front end (left side in FIG. 5 and right side in FIG. 6) of the base plate 31 onto which the HDD 30 is fixed.

In other words, the ejector 36 is used as a handle for removing the HDD 30 from the inside of the mounting device 10. In addition, by rotating the ejector 36 about a shaft portion 37, it is possible to release the lock set by the ejector 36. Specifically, the ejector 36 allows the HDD 30 to be unfixed with respect to the outer case 11 of the mounting device 10.

The HDD 40 is fixed onto a base plate 41. An ejector 46 that makes the HDD 40 fixed at a predetermined position is arranged on the base plate 41 onto which the HDD 40 is fixed. In the same manner as of the ejector 36 arranged on the base plate 31 of the HDD 30, by rotating the ejector 46 about a shaft portion 47, it is possible to release the lock set by the ejector 46. Specifically, the ejector 46 allows the HDD 40 to be unfixed with respect to the side surface plates 22 (FIG. 7) of the inner case 20.

Structure of the Inner Case 20

The inner case 20 is an elongated sheet-metal member formed in a rail shape, and includes a main-body plate portion 21 having a predetermined width (3.5 inches), and a pair of side surface plates 22 fixed on both sides of the main-body plate portion 21. The two guiding grooves 23 and 24 arranged on the upper and lower positions as recess grooves are formed on each of the side surface plates 22.

In each of the guiding grooves 23 and 24 (FIG. 7), an oblique groove 25 and a parallel groove 26 are formed. The shaft portions 34 and 35 fixed onto the side surface portion 32 of the HDD 30 are capable of fitting into the oblique grooves 25 and the parallel grooves 26 of the guiding grooves 23 and 24. As will be described later, by extracting the inner case 20 toward the front side, it is possible to cause the HDD 30 arranged on the front side to ascend to a predetermined position along the guiding grooves 23 and 24.

Figure 12:
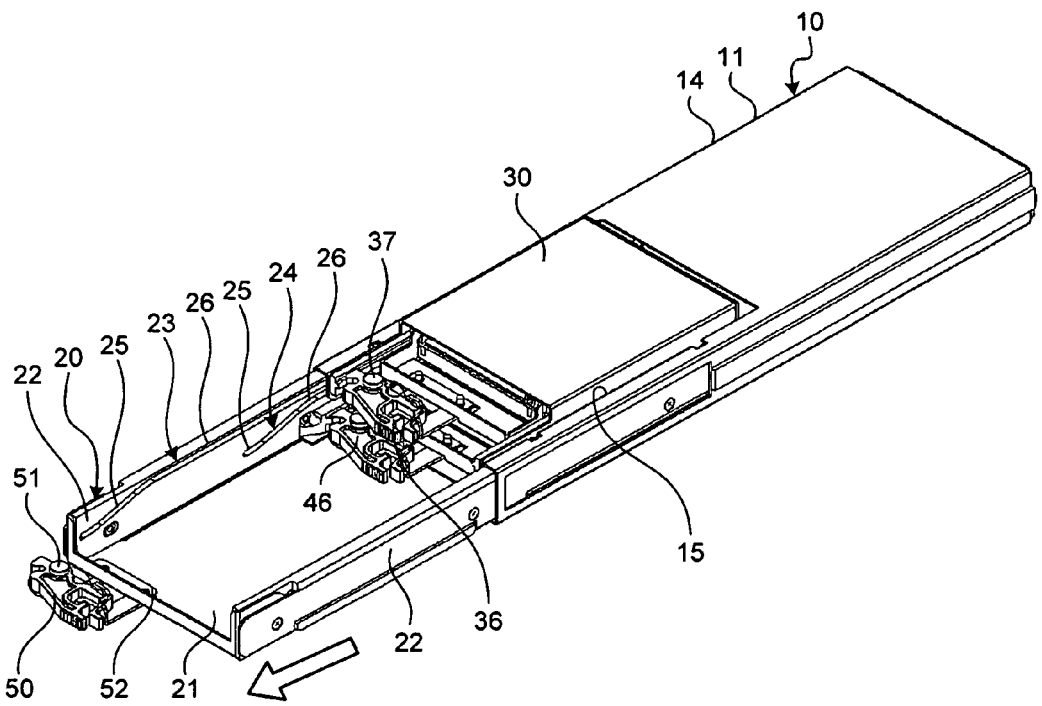
FIG. 12 is a perspective view illustrating the inside of the mounting device when the inner case is extracted therefrom.

On the front side of the main-body plate portion 21 of the inner case 20, an ejector 50 used for removing the inner case 20 and making the inner case 20 locked by rotation thereof about a shaft portion 51 is fixed via a hinge portion 52 (FIG. 12).

The ejector 50 provided on a front end (left side in FIG. 5) of the inner case 20 is arranged so as to be bent downward by approximately 90 degrees with the hinge portion 52 provided on a base end portion of the ejector 50.

Figure 9A:
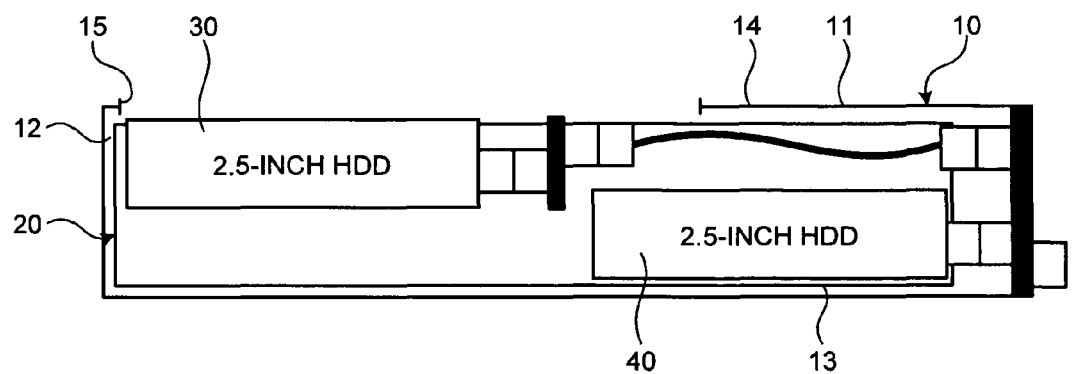
FIG. 9A is a view for explaining the inside of the mounting device in a normal state.
Figure 10:
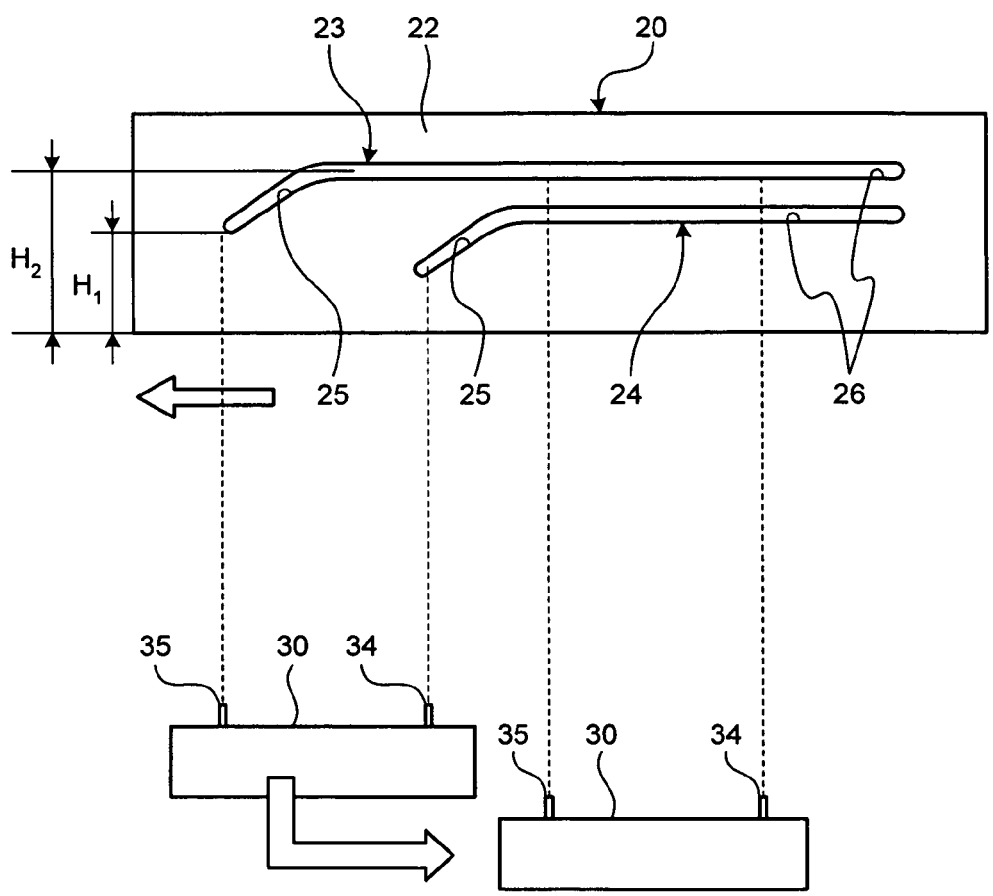
FIG. 10 is a view for explaining an operational outline of the mounting device.

An outline of the mounting device indicated in the first embodiment will now be described. FIG. 9A is a view for explaining the inside of the mounting device in a normal state. FIG. 9B is a view for explaining the inside of the mounting device when the inner case is moved. FIG. 10 is a view for explaining an operating state of the mounting device.

As illustrated in FIG. 9A to FIG. 10, the mounting device 10 has the 2.5-inch type HDDs 30 and 40 mounted on the front side and the back side, respectively, in the depth direction of the slot portions 12 and 13 formed in the size for a 3.5-inch type. When the 2.5-inch type HOD 40 on the back side is extracted, the 2.5-inch HDD 30 on the front side moves upward (upper side in FIG. 9A).

In other words, as illustrated in FIG. 9A, in the mounting device 10, the two HDDs 30 and 40 are retained, and the inner case 20 that slides between the front side and the back side (right and left directions in FIG. 9A) is provided in the outer case 11 that forms the mounting device 10.

When the HDD 40 mounted on the back side in the mounting device 10 is to be extracted, the inner case 20 is extracted toward the front side (direction of a in FIG. 9B), thereby causing the HDD 30 mounted in the slot portion 12 on the front side to ascend toward the upper side (direction of b in FIG. 9B) along the guiding grooves 23 and 24 on the inner case 20 when the inner case 20 is extracted. Therefore, the HDD 40 mounted in the slot portion 13 on the back side can be extracted toward the front side (direction of c in FIG. 9B) without being obstructed by the HDD 30.

Specifically, as illustrated in FIG. 9A, when the inner case 20 is housed in the mounting device 10 (when the inner case 20 is not extracted), the shaft portions 34 and 35 of the HDD 30 mounted on the front side of the mounting device 10 fit into lower end portions of the respective oblique grooves 25 of the guiding grooves 23 and 24 formed on the side surface plates 22 of the inner case 20. Therefore, the HDD 30 is in a stopped state, and the height of the HDD 30 at this time is a height $H_1$ in FIG. 10.

By contrast, as illustrated in FIG. 9B, when the inner case 20 is extracted, the shaft portions 34 and 35 of the HDD 30 ascend gradually along the oblique grooves 25 of the guiding grooves 23 and 24 formed on the side surface plates 22 of the inner case 20 to the positions of the parallel grooves 26. Therefore, the height of the HDD 30 at this time is a height $H_2$ in FIG. 10.

In other words, the HDD 30 ascends through the portion defining an opening 15 of the upper surface plate 14 to move automatically to a position where the HDD 30 does not obstruct passage of the HDD 40 mounted on the back side of the HDD 30.

In the first embodiment, the portion defining an opening 15 to which the HDD 30 is evacuated is formed on the upper surface plate 14. However, in the case where such a portion defining an opening is formed on a lower surface plate of the outer case 11, when the mounting devices 10 are housed in a plurality of rows, HDDs evacuated from the mounting devices arranged in a lower row can be evacuated in the outer case, thereby making it possible to use vacant spaces effectively.

Extracting Operation of the HDDs by the Inner Case

Figure 11:
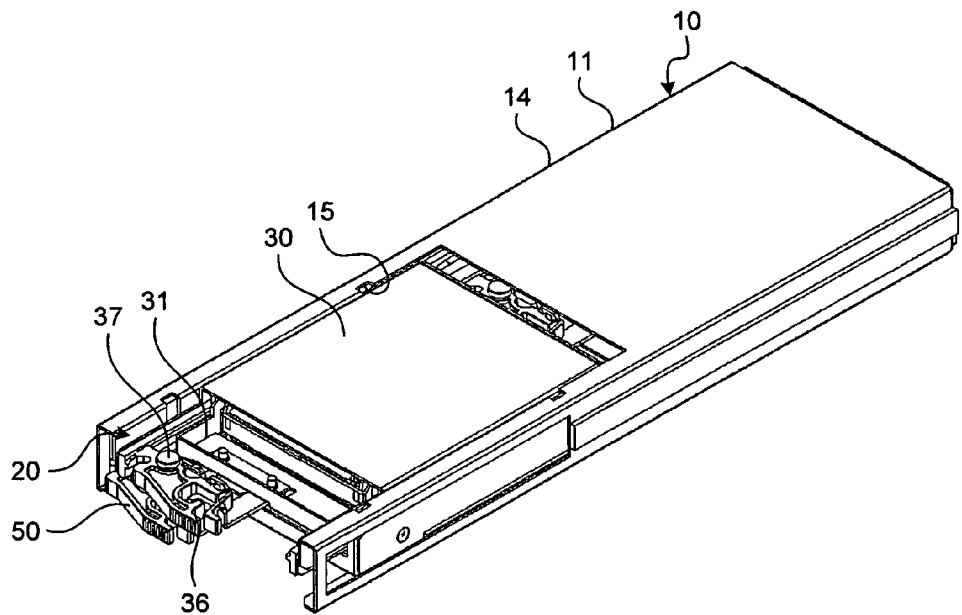
FIG. 11 is a perspective view illustrating the mounting device when the inner case is housed therein.
Figure 13:
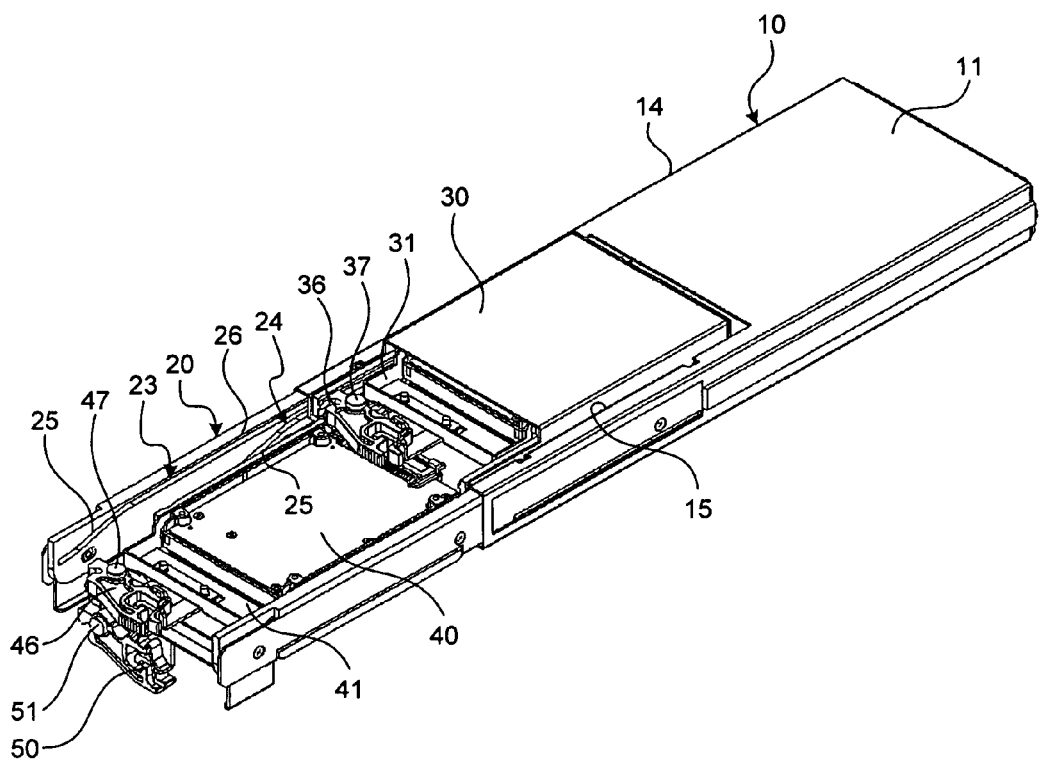
FIG. 13 is a perspective view illustrating the mounting device when the inner case is extracted therefrom.
Figure 14:
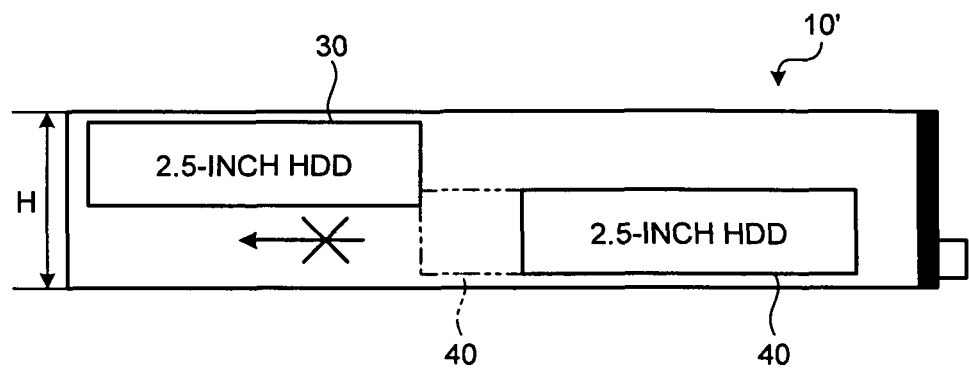
FIG. 14 is a view for explaining an operation performed for a conventional mounting device.
Figure 15:
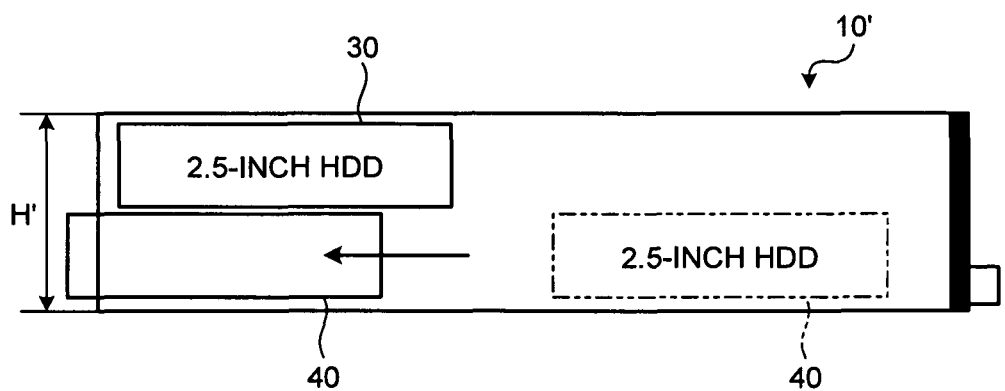
FIG. 15 is a view for explaining a modification of the mounting device.

A detail description will be made of a process of the extracting operation of the HDDs 30 and 40 mounted in the mounting device 10. FIG. 11 is a perspective view illustrating the mounting device when the inner case is housed therein. FIG. 12 is a perspective view of the mounting device when the inner case is extracted therefrom. FIG. 13 is a perspective view of the mounting device when the HDD on the back side is extracted therefrom.

As illustrated in FIG. 11, when the HDD 40 on the back side is to be extracted from the mounting device 10, the tip portion of the ejector 50 arranged on the front end of the inner case 20 is rotated about the shaft portion 51, thereby releasing the lock set by the ejector 50. Specifically, the ejector 50 allows the inner case 20 fixed onto the side surfaces of the outer case 11 to be unfixed therefrom.

Subsequently, as illustrated in FIG. 12, the ejector 50 arranged on the inner case 20 is hold by fingers or the like to extract the inner case 20 toward the front side (left side in FIG. 12). As described above, by extracting the inner case 20 toward the front side, the HDD 30 ascends along the oblique grooves 25 of the guiding grooves 23 and 24 formed on the side surface portions of the inner case 20. With this ascent, the HDD 30 protrudes from the portion defining an opening 15 of the upper surface plate 14 to be positioned on the parallel grooves 26 of the guiding grooves 23 and 24.

When the inner case 20 is extracted, because the HDD 40 on the back side is locked within the inner case 20, the HDD 40 can also be extracted to the position of the HDD 30 on the front side (just under the HDD 30 in FIG. 12).

Subsequently, as illustrated in FIG. 13, the ejector 50 arranged on the front end of the inner case 20 extracted toward the front side of the mounting device 10 is bent downward by approximately 90 degrees about the hinge portion 52. Bending the ejector 50 arranged on the front end of the inner case 20 downward allows the HDD 40 mounted on the back side to be extracted toward the front side of the inner case 20 in this manner.

In other words, by extracting the inner case 20 toward the front side, it is possible to operate (release the lock of) the ejector 46 arranged on the front end of the base plate 41 of the HDD 40 on the back side. Subsequently, the lock set by the ejector 46 is released to extract the HDD 40 to the front of the inner case 20 completely.

In this case, as illustrated in FIG. 13, the HDD 30 ascends along the oblique grooves 25 of the guiding grooves 23 and 24, and protrudes from the portion defining an opening 15 on the upper surface plate 14, thereby facilitating the extraction of the HDD 40 without being obstructed by the HDD 30.

As described above, the mounting device 10 of the first embodiment is provided with the inner case 20 on which the guiding grooves 23 and 24 for causing the HDD 30 mounted on the front side to ascend to the predetermined position are formed. Therefore, by extracting the inner case 20 toward the front side, the HDD 30 mounted on the front side of the slot portion 12 is evacuated to the upper side, thereby making it possible to extract the HDD 40 mounted on the back side of the slot portion 13 without being obstructed by the HDD 30. Accordingly, it is possible to select the HDDs according to purposes of a user appropriately, and mount the two 2.5-inch type HDDs 30 and 40 having small-sized and high-speed characteristics on the slot space formed in the size for a 3.5-inch type in a manner capable of hot swapping.

[b] Second Embodiment

The mounting device according to the first embodiment of the present invention is explained above. The mounting device of the present invention can be realized, in addition to the first embodiment, by various types of different embodiments within the spirit and scope of the technical concepts as set force in the appended claims.

As described above in the first embodiment, when the inner case 20 provided in the mounting device 10 (FIG. 8) is extracted, the HDD 30 mounted on the front side of the slot portion 12 is caused to ascend along the oblique grooves 25 of the guiding grooves 23 and 24 of the inner case 20 to be positioned on the parallel grooves 26.

Subsequently, the HDD 40 mounted on the back side of the slot portion 13 of the mounting device 10 can be extracted without being obstructed by the HDD 30 on the front side. Alternatively, in a second embodiment, the HDD 30 mounted on the front side may be caused to descend along the guiding grooves 23 and 24 of the inner case 20 instead of being caused to ascend as in the first embodiment.

In the second embodiment, in the same manner as in the first embodiment, the HDD 30 on the front side can be moved to a position where the HDD 30 does not obstruct the extraction of the HDD 40 on the back side in association with the extraction of the inner case 20. Accordingly, it is possible to extract the HDD 40 arranged on the back side without being obstructed by the HDD 30 mounted on the front side.

With the disclosed mounting device, it is possible not only to mount two HDDs in the mounting device, but also to select two types of hard disks optionally according to purposes of a user. Furthermore, with the disclosed mounting device, it is possible to make each of the two 2.5-inch HDDs thus mounted capable of hot swapping.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mounting device for storage device comprising:

a first case formed in a size large enough to house therein a storage device of a size conforming to a first standard;

a second case that is housed in the first case in a manner extractable therefrom along a longitudinal direction of the first case, and that retains storage devices of a size conforming to a second standard on its front side and its back side in the longitudinal direction viewed from a side to which the second case is to be extracted from the first case; and a guiding groove formed on the second case so as to cause the storage device retained on the front side to move in a vertical direction viewed from the longitudinal direction such that the storage device retained on the front side does not obstruct movement of the storage device retained on the back side that moves along the longitudinal direction on extracting the second case from the first case.

2. The mounting device according to claim 1, wherein the guiding groove includes an oblique groove that causes the storage device retained on the front side to move in the vertical direction, and a parallel groove that retains the storage device caused to ascend in the vertical direction along the oblique groove.

3. The mounting device according to claim 1, wherein the second case is provided with a first ejector that is used for extracting the second case from the first case and that fixes the second case at a predetermined position of the first case, and with a second ejector that is used for extracting the storage devices from the second case and that fixes the storage devices at a predetermined position of the second case.

4. The mounting device according to claim 1, wherein the first case is provided with a portion defining an opening through which the storage device retained on the front side is evacuated in the vertical direction to a position where the evacuated storage device does not obstruct movement of the storage device retained on the back side that moves along the longitudinal direction when the second case is extracted.

5. The mounting device according to claim 1, wherein the first case is provided with a portion defining an opening though which the storage device retained on the front side is evacuated in the vertical direction to a position where the evacuated storage device does not obstruct movement of the storage device retained on the back side that moves along the longitudinal direction when the second case is extracted, and a bottom portion of the first case is provided with an evacuation orifice through which the storage device evacuated from the portion defining an opening formed on an upper portion of another first case different from the first case is evacuated.

* * * * *